United States Patent [19]  [11] 4,026,834
Cordes et al.  [45] May 31, 1977

[54] MANUFACTURE OF POLYAMIDE FOAMS

[75] Inventors: Claus Cordes, Weisenheim; Erich Strickle, Mannheim; Josef Zendath, Hassloch; Georg Nikolaus Simon, Limburgerhof, all of Germany

[73] Assignee: BASF Aktiengesellschaft, Ludwigshafen, Germany

[22] Filed: Dec. 22, 1975

[21] Appl. No.: 643,106

[30] Foreign Application Priority Data

Jan. 3, 1975  Germany .......................... 2500181

[52] U.S. Cl. ........................... 260/2.5 N; 260/78 L
[51] Int. Cl.$^2$ .......................................... C08J 9/14

[58] Field of Search ............. 260/78 L, 78 P, 2.5 N

[56] References Cited

UNITED STATES PATENTS 3,850,890  11/1974  Ciaperoni ........................ 260/78 P

*Primary Examiner*—Morton Foelak
*Attorney, Agent, or Firm*—Keil, Thompson & Shurtleff

[57]  ABSTRACT

A process for the manufacture of polyamide foams by anionic polymerization of lactams, in which from 0.1 to 15% w/w tetrachloroethylene is added to the reaction mixture to be foamed. The resulting foams are very tough, even at low temperatures.

2 Claims, No Drawings

MANUFACTURE OF POLYAMIDE FOAMS

It is known to manufacture polyamide foams by the method of activated anionic polymerization wherein the foaming agents are gases which are passed into the mixture before or during polymerization or solvents which are mixed with the polymerization mixture and are capable of converting to the gaseous state under the conditions of reaction, or materials which are added to the polymerization reaction and are capable of liberating gases during polymerization. It is also known to use activators and catalysts which are at the same time capable of eliminating gases under the conditions of the reaction. The polyamide foams obtained by said processes are rigid and brittle after manufacture. If they are allowed to absorb water or are stored in swelling solvents, they achieve higher toughness values but break when subjected to flexural stresses. However, even those toughness values achieved by these expensive methods are unsatisfactory. It is also known that the brittleness of such foams may be reduced by the addition of methylene biscaprolactam or by the use of activators having at least 3 functional groups. However, the use of these materials is unsatisfactory for the simple reason that both methylene biscaprolactam and the polyfunctional activators are expensive to produce and their use makes the manufacture of the foams less economical.

It is an object of the present invention to provide tough polyamide foams whilst avoiding the disadvantages in the prior art. It is a particular object of the invention to provide polyamide foams which exhibit high toughness values even at low temperatures.

We have found, surprisingly, that this object may be achieved in the manufacture of polyamide foams by anionic polymerization of lactams by adding from 0.1 to 15% and preferably from 0.5 to 5%, by weight, of tetrachloroethylene. The conventional starting material for the process of the invention is molten lactam having temperatures of from 80° to 200° C and preferably from 100° to 170° C. However, higher or lower temperatures may be used for specific purposes. It is usual to start with two lactam melts, one containing the catalyst and the other the activator. Foaming agents are also used to prepare the foams. The tetrachloroethylene to be added according to the invention, the foaming agents used and any other additives may be totally or partially added to one of the said two starting melts or to a third portion of molten lactam. The process is then carried out by mixing the activator-containing and catalyst-containing lactam melts with the novel additive of tetrachloroethylene and the foaming agent either directly or in the form of a third lactam melt, such mixing being carried out with or without further quantities of molten lactam and either directly in the mold or immediately prior to filling the mold.

In a special embodiment, the molds used are heated preferably to temperatures of from 120° to 170° C. In the simplest case, satisfactory results are achieved by mixing all of the components in the mold and allowing the mixture to foam. Alternatively, the components may be mixed in an intermediate vessel with thorough brief stirring, whereupon the mixture is immediately passed to a heated mold, in which it can foam to form a shaped article. If desired, this method may be carried out continuously. The foams of the invention may also be prepared using foaming machines such as are generally known for the manufacture of, say, polyurethane foams, in which case it is advantageous to provide heating means of the vessel, pipelines, valves, pumps and mixing heads. Such foaming machines may be used to fill heated forms periodically, or the mixture may be continuously applied to heated conveyor belts on which the mixture polymerizes and foams to give an endless foamed section. The process of the invention also permits partial prefoaming with subsequent shaping followed by post-expansion. Suitable lactams for the manufacture of foams by the process of the invention are, in particular, $\epsilon$-caprolactam, capryllactam, enantholactam, lauryllactam, C-substituted lactams, methylene biscaprolactams and mixtures thereof. Suitable polymerization catalysts are conventional catalysts such as sodium, potassium, calcium or basic compounds thereof, for example the amides or hydrides, the alkali metal lactam compounds or the metalorganic compounds of the metals in groups Ia to IIIa of the Periodic Table. Suitable polymerization accelerators are the conventional activators such as acylated lactams, compounds having an acylating action such as isocyanates, ketenes, acid chlorides, carbodiimides, cyanamides, acid anhydrides and adducts of these compounds or materials which eliminate said compounds. Suitable foaming agents are low-boiling liquids, i.e. liquids which boil at temperatures below the softening point of the particular polyamide. We prefer to use liquids which are soluble in the molten lactams. Suitable liquid foaming agents are aliphatic and cycloaliphatic hydrocarbons such as hexane, octane and cyclohexane, aromatic hydrocarbons such as benzene and toluene, and open-chain and cyclic ethers such as dibutyl ether and dioxane. It is also possible to use very low-boiling liquids such as pentane and to effect mixing thereof with the lactam, e.g. under pressure. Alternatively, solid compounds which decompose on heating to eliminate gases may be used as foaming agents, examples being azoisobutyronitrile, benzenesulfonic hydrazide and aryl sulfazides. Mixtures of solid and/or liquid foaming agents are also highly effective. A further alternative is to use activators and catalysts which themselves give off gases under the conditions of the reaction. The amount of foaming agent used depends essentially on the desired density of the foam. The amount used is generally of the same order of magnitude as used in prior art foaming techniques.

Soluble and/or insoluble dyes and fillers may be added to the polymerization mixture to be foamed, provided such additives have no detrimental effect on the activator/catalyst system. Such additives include polymers and oligomers, e.g. lactam oligomers, and inorganic materials such as glass fibers, glass spheres, asbestos and other ceramic materials, metal powder, graphite, gypsum, chalk, molybdenum disulfide and natural materials such as treated sawdust, natural, viscose and synthetic fibers. It is also possible to add crystallizing accelerators such as magnesium silicates, graphite, molybdenum disulfide and high-melting polyamides and other additives, for example those having a plasticizing effect such as dimethylformamide, dimethylsulfoxide and N-methylpyrrolidone. In our novel process, it is also possible to add conventional auxiliaries such as foam stabilizers, e.g. those based on silicones, and nucleating agents for foam formation, e.g. finely divided inorganic solids, particularly gypsum. Use may also be made of thermal stabilizers, e.g. those based on copper, and aminic and phenolic stabilizers in the process of the invention.

According to a special embodiment of the process of the invention, from 0.1 to 15% by weight of tetrachloroethylene and from 1 to 10% by weight, preferably from 2 to 6% by weight, of a polyetherol having a molecular weight of from 1,000 to 5,000 are added to the mixture to be foamed. We prefer to make use of those polyetherols having a molecular weight of from 2,000 to 3,000, particularly polytetrahydrofuran and polypropylene oxide. It has been found satisfactory to use polyetherols in accordance with the invention, particularly in combination with isocyanates acting as activators. In a particular embodiment of the process of the invention, the activators used are initially reacted with the polyetherols to be used and are then used in the manufacture of the foams by the method described.

The process of the invention provides, surprisingly, extremely tough, attrition-resistant and water-resistant polyamide foams which retain these properties even at low temperatures. These effects are particularly surprising, since other halocarbons such as chloroform, carbon tetrachloride, tetrachloroethane and trichloroethylene interfere with the polymerization and it is not possible to produce polyamide foams using additives of this kind.

The polyamide foams produced by the process of the invention constitute products having particularly good properties for the various well known foam applications. They are particularly suitable for the absorption of vibrations and shocks.

EXAMPLE 1

The following components are mixed in case (a):
1. 31 parts of sodium caprolactamate in 469 parts of molten caprolactam at 135° C,
2. 88 parts of hexamethylene biscaprolactam carbamate in 412 parts of molten caprolactam at 135° C and
3. a mixture of 35 parts of naphtha boiling over a range of from 80° to 140° C, 15 parts of perchloroethylene and 1 part of foam stabilizer (foam stabilizer U 119 by Wacker).

The following components were mixed in case (b):
1. 31 parts of sodium caprolactamate in 469 parts of molten caprolactam at 135° C,
2. 88 parts of hexamethylene biscaprolactam carbamate in 412 parts of molten caprolactam at 135° C, and
3. 35 parts of naphtha boiling over a range of from 80° to 140° C and 1 part of foam stabilizer (foam stabilizer U 119 by Wacker).

In each case, the components are thoroughly mixed for 5 seconds. The mixture then foams to form a medium-pore foam having a density of about 160 g/dm$^3$. Specimens are cut from each of the foams with the dimensions 10 × 1.2 × 1.7 cm. The specimens are soaked in water for 1 hour at room temperature and then bent over a pipe having a diameter of 25 mm. In case (a) the test specimen passes this test whilst in case (b) it breaks when bent.

EXAMPLE 2

Example 1(a) is repeated except that the component (2) consists of a mixture of 88 parts of hexamethylene biscaprolactam carbamate and 362 parts of ε-caprolactam and 50 parts of capryllactam at 135° C. When tested according to Example 1, the resulting foam shows no fracture when bent.

EXAMPLE 3

Example 1(a) is repeated except that the component (2) is a mixture of 88 parts of hexamethylene biscaprolactam carbamate and 362 parts of ε-caprolactam and 50 parts of lauryllactam at 135° C. When tested according to Example 1, the resulting foam shows no fracture when bent.

EXAMPLE 4

Example 1(a) is repeated except that the component (2) is a mixture of 88 parts of hexamethylene biscaprolactam carbamate in 362 parts of molten ε-caprolactam at 135° C and 50 parts of an adduct of 2 moles of hexamethylene diisocyanate and 1 mole of polypropylene oxide diol having a molecular weight of 3,000.

Specimens are made from the foams of Examples 1 to 4, the dimensions being 35 × 35 × 30 mm. The specimens are cooled to −40° C and the surface measuring 35 × 35 mm is placed on a flat surface. The specimens are subjected to the shock of a 1 kg weight having a flat undersurface larger than the top surface of the test specimen falling freely from different heights. The results of this test are listed in the following Table.

TABLE

| Height of fall [m] | Compression in [mm] Example | | | | |
|---|---|---|---|---|---|
| | 1a | 1b | 2 | 3 | 4 |
| 0.8 | 4.5 | fractures | 1 | 2 | 2.5 |
| 1.4 | 9 | fractures | 4 | — | 5 |

We claim:
1. In a process for the manufacture of polyamide foams by the anionic polymerization of a lactam wherein said lactam is heated in the presence of a catalyst and an activator and the resultant polymer is foamed by means of a foaming agent, the improvement which comprises carrying out said polymerization in the presence of 0.1 to 15 and preferably from 0.5 to 5% by weight of tetrachloroethylene.
2. A process as claimed in claim 1, wherein the lactam used is ε-caprolactam.

* * * * *